United States Patent [19]

Chown et al.

[11] 4,185,885
[45] Jan. 29, 1980

[54] OPTICAL FIBER CONNECTOR

[75] Inventors: Martin Chown; Melvin M. Ramsay, both of Harlow, England

[73] Assignee: International Standard Electric Corporation, New York, N.Y.

[21] Appl. No.: 929,792

[22] Filed: Jul. 31, 1978

[30] Foreign Application Priority Data

Aug. 2, 1977 [GB] United Kingdom ............... 32359/77

[51] Int. Cl.² ................................................ G02B 5/14
[52] U.S. Cl. .................................................. 350/96.18
[58] Field of Search ............... 350/96.20, 96.21, 96.22, 350/96.15, 96.18, 294

[56] References Cited

U.S. PATENT DOCUMENTS

| 3,536,908 | 10/1970 | Oster | 350/294 X |
| 3,995,935 | 12/1976 | McCartney | 350/96.15 |
| 4,054,364 | 10/1977 | Webster | 350/96.18 |

FOREIGN PATENT DOCUMENTS 1017354  1/1966  United Kingdom ................. 350/96.18

Primary Examiner—Rolf G. Hille
Attorney, Agent, or Firm—Thomas L. Peterson

[57] ABSTRACT

An optical fiber connector in which each fiber is terminated by a coupling element comprising a cylindrical transparent body having a concave reflector on one end facing into the body and a circular reflector on the opposite end facing the concave reflector. The circular reflector has a diameter less than that of the cylindrical body and is concentric therewith. This arrangement has the advantage that the main focussing elements are reflectors and therefore require far less curvature than lenses.

10 Claims, 3 Drawing Figures

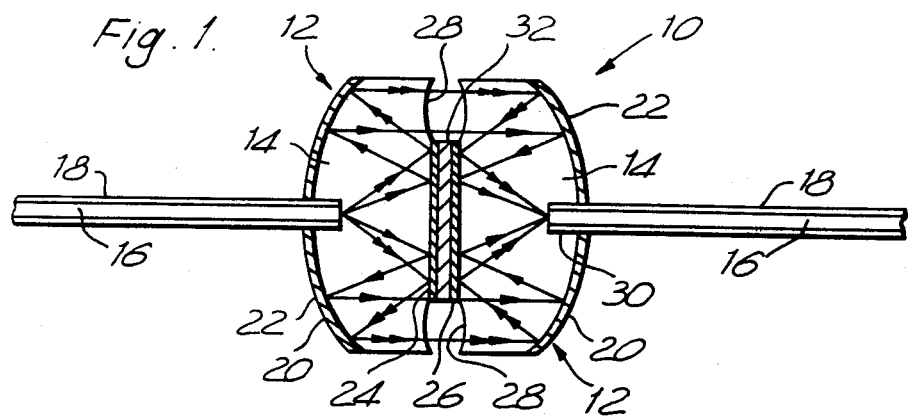
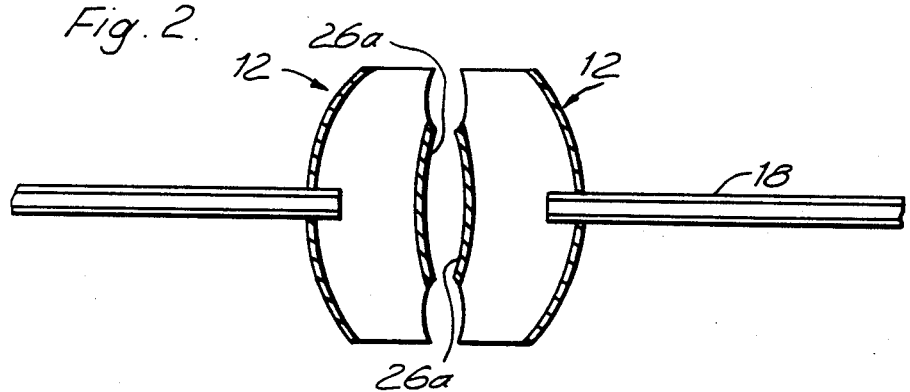
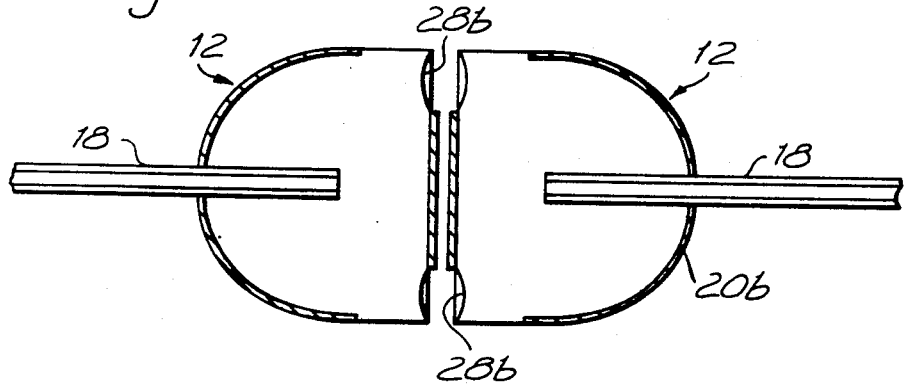

OPTICAL FIBER CONNECTOR

BACKGROUND OF THE INVENTION

The present invention relates to connectors for optical fibers, such as are used in the telecommunications industry.

It is well-known in the fiber optic connector art that in order to minimize light transmission losses between mating pairs of optical fibers, it is necessary to precisely laterally align the fibers in a connector. Such alignment is difficult to achieve because of the very small diameters of the fibers. One approach to minimize light transmission losses between optical fibers is to use suitable lenses therebetween. Still another means for coupling optical fibers is the use of reflectors. For example, U.S. Pat. No. 3,995,935 to McCartney discloses an optical coupler comprising a parabolic reflecting chamber having one optical fiber mounted at the base or the larger end of the chamber with the second optical fiber extending into the interior of the chamber from the opposite concave end thereof. The interior of the chamber is coated with a reflective surface so that light entering the chamber from the first fiber reflects off the surface and impinges upon the outer surface of the outer fiber extending into the chamber. Another optical coupling arrangement is disclosed British Pat. No. 1,017,354 for coupling two fiber optic bundles of different diameters. The coupling element in this arrangement comprises a solid glass parabolic coupler having its surface coated with a reflective material. The larger bundle is positioned adjacent to the larger end of the coupler, while the smaller bundle is positioned adjacent to the opposite smaller end of the coupler.

It is the object of the present invention to provide an improved optical coupling arrangement for single optical fibers.

SUMMARY OF THE INVENTION

According to a principal aspect of the present invention, there is provided a connector for optical fibers comprising a matched pair of coupling elements each comprising a cylindrical body of transparent material having a refractive index substantially the same as that of the fibers to be connected. The cylindrical body of each element has on one end face a concave reflector, concentric with the body. The reflector faces into the body. The other end of the body has a circular reflector facing the concave reflector. The circular reflector has a diameter less than that of the cylindrical body and is concentric therewith. The concave reflector has at its center an aperture equal in diameter to the diameter of the fiber to be connected. Means is provided for optically coupling the end of an optical fiber to the transparent element via the aperture in the concave reflector. The coupling elements are arranged in mutual alignment with the concave reflectors facing each other.

BRIEF DESCRIPTION OF THE DRAWINGS

FIG. 1 is a somewhat schematic illustration of one embodiment of the connector of the present invention;

FIG. 2 is a schematic illustration of a second embodiment of the invention; and

FIG. 3 is a schematic illustration of a third embodiment of the invention.

DESCRIPTION OF THE PREFERRED EMBODIMENTS

Referring now to the drawings in detail, wherein like reference numerals are utilized to designate like or corresponding parts throughout the various views, there is illustrated in FIG. 1 one embodiment of the connector of the present invention, generally designated 10. The connector comprises a pair of matched coupling elements, each designated 12. Each coupling element comprises a cylindrical body 14 fabricated from a glass or plastic material having the same refractive index as the core 16 of the optical fiber 18 which is to be connected. The cylindrical body 14 of each element 12 has a spherical rear end surface 20 which is silvered or otherwise treated to form a concave mirror 22.

The front end surface of the cylindrical body 14 of each coupling element has a central circular flat portion 24 which is also mirrored, as indicated at 26. This central portion 24 is surrounded by an annular portion 28 which may be shaped as an aspherical refractor.

The rear of each body 14 has a cylindrical bore 30 coaxial with the axis of the cylindrical body and extending partway into the body. The bore receives the end of the optical fiber 18 which, if necessary, may be cemented into place.

It is preferred that the bottom of the bore 30 and, hence, the end face of the fiber 18 be located so that the fiber/element coupling occurs at or near the effective focal point of the concave reflector as formed in the reflector 26 at the forward end of the coupling element.

The two coupling elements are held in mutual alignment a predetermined distance apart by an external housing, not shown. The spacing of the elements may be assisted by positioning a spacer 32 between the front ends of the elements in the region of the reflecting surfaces 26. The spacer allows the coupling elements to be pushed together by the housing until they are the correct distance apart.

The light propogation through the connector is depicted by the arrowed lines illustrated in FIG. 1. The primary advantage of this design is that the main focusing element is used in reflection, that is, the mirror 20, which requires far less curvature than lenses. Also, the aspheric correcting portion 28 of the coupling element is comparatively simple and techniques for achieving such surfaces are well known. The invention provides a comparatively easy method of connecting optical fibers with a high numerical aperture, for example 0.75.

The losses associated with four metallic reflections between two fiber ends can be minimized substituting multi-layered dielectric coatings. The dielectric/air interfaces can be bloomed in the conventional manner.

The effect of the aperture stop formed by the plane reflector 26 can be reduced by using a convex spherical, rather than plane surface, as indicated at 26b in FIG. 2 and it is possible to match this stop to the region of anomalously low refractive index in the center of most fiber waveguides made by a chemical vapor reaction. Since this anomoly results in low order modes with far from designed group velocity, their elimination improves the modal dispersion. In this removal is repeated at every coupler, any effects of mode coupling to these undesirable modes can also be eliminated.

As an alternative to shaping the portion 28 as an aspherical refractor, the concave reflector surface 20 may be contoured to provide the aspherical correction required, for example as a parabolic mirror, as illustrated in FIG. 3 and designated 20b. Yet another way of achieving the required correction is to contour the circular reflector 26, not shown. In each of these designs the annular portion, designated 28b in FIG. 3, can then have a flat surface.

What is claimed is:

1. A connector for optical fibers comprising:
a matched pair of coupling elements each comprising a cylindrical body of transparent material having a refractive index substantially the same as that of the fibers to be connected;
the cylindrical body of each said element having on one end face a concave reflector, concentric with the body, said reflector facing into said body;
the other end of said body having a circular reflector facing said concave reflector;
said circular reflector having a diameter less than that of said cylindrical body and being concentric therewith;
said concave reflector having at its center an aperture equal in diameter to the diameter of the fiber to be connected;
means for optically coupling the end of an optical fiber to the transparent element via said aperture in the concave reflector; and
said coupling elements being arranged in mutual alignment with said concave reflectors facing each other.

2. A connector as set forth in claim 1 including:
means positioning said coupling elements at a predetermined distance apart.

3. A connector as set forth in claim 1 wherein:
said concave reflectors are spherical.

4. A connector as set forth in claim 1 wherein:
said circular reflector facing said concave reflector in each element is a plane reflector.

5. A connector as set forth in claim 1 including:
aspheric refracting means disposed annularly on the other end of each said body between said circular reflector and the periphery of said other end.

6. A connector as set forth in claim 1 wherein:
said concave reflectors are contoured to provide aspherical correcting surfaces.

7. A connector as set forth in claim 1 wherein:
said circular reflector facing said concave reflector in each said element is contoured to provide aspherical correction surfaces.

8. A connector as set forth in claim 1 wherein:
the cylindrical body of each said element is made of glass.

9. A connector as set forth in claim 1 wherein:
the aperture in the concave reflector of each said coupling element is the opening of a bore extending partway into the transparent coupling element into which the end of a fiber to be connected is inserted such that the fiber/element optical coupling occurs at substantially the image of the effective focal point of the concave reflector as formed in the reflector at said other end.

10. A connector as set forth in claim 1 including:
a spacer affixed to the or each coupling element on the rear of said circular reflector.

* * * * *